Oct. 14, 1969 C. P. LEERSNIJDER ET AL 3,473,111

THIN METAL MARKING AND METHOD FOR DETECTING THE SAME

Filed April 7, 1966

INVENTORS.
C. P. LEERSNIJDER
G. Z. LIFSCHITZ
BY Hugh A. Kirk
ATT'Y.

United States Patent Office 3,473,111
Patented Oct. 14, 1969

3,473,111
THIN METAL MARKING AND METHOD FOR DETECTING THE SAME

Carolus Pieter Leersnijder, Heemstede, and Garbriël Zwy Lifschitz, The Hague, Netherlands, assignors to De Staat der Nederlanden, Ten Deze Vertegenwoordigd Door de Directeur-Generaal der Posterijen, Telegrafie en Telefonie, The Hague, Netherlands Filed Apr. 7, 1966, Ser. No. 541,005
Claims priority, application Great Britain, Apr. 29, 1965, 18,060/65
Int. Cl. G01r 33/12
U.S. Cl. 324—41 6 Claims

ABSTRACT OF THE DISCLOSURE

A method and apparatus for detecting electrically conducting layers having a thickness between about 50 and 500 millimicrons, such as on a postage stamp, by means of inducing a frequency between about 10 and 100 megacycles into said layer by an induction coil in an oscillating circuit, and detecting, with a vacuum tube volt meter or a watt meter, the damping of the oscillating circuit because at this frequency the thickness of the layer is less than its skin depth.

Related applications

British patent application Ser. No. 18,060/65 filed Apr. 29, 1965, now British Patent No. 1,107,046, from which this application claims priority.

Summary of invention

The present invention relates generally to improved methods and apparatus for marking articles and detecting such marking. In particular the invention is concerned: (a) with the marking of documents such as postal packets, letters, postcards, cards, and forms with information concerning a desired orientation of the documents, and (b) with machine-reading of such information to control facing or alignment of the documents in said desired orientation. This invention is also applicable to the marking and reading of information in general.

In machine handling of such items as letters and postcards, it is customary to automatically face each item with a particular orientation suited to a desired operation, such as: stamp cancellation, address reading or sorting. Thus each item is marked in such a way that when the marking is detected in a given location, the item then has the correct orientation for the desired operation.

The invention is in the choice of (1) an extremely thin electrically conductive metal layer (of the order of 100 millimicrons) as a marking, and of the choice of (2) a frequency for detecting such a thin metal layer, that for this frequency the thickness of that metal layer remains smaller than its skin depth, thereby providing the possibility of discriminating between such thin metal layers and other electrically conducting materials which are many times thicker, such as tinfoil, paper-clips, coins, and keys which may occur in the postal pockets.

In order to mark a document, a thin deposit of metal of the order of 100 millimicrons thickness is applied to a localised area of the face of the document either directly, for example by vapor deposition, or by attaching to the document an adhesive stamp bearing such a deposit. The metal may be aluminum, zinc, copper, silver, gold or almost any thin electrically conducting layer.

In order to detect such a thin metal layer marking on a document, the document is positioned in proximity to a detector which comprises a high frequency generator circuit, operating in the range of between about 10 and 100 mc./s. so that the marking influences an electromagnetic field created by the operation of the generator in a way which produces a detectable change in the operation of the generator. For example, the document may be moved past a coil forming part of the detector circuit so as to modify the inductance and/or the Q of the generator output circuit with a result that the generator is detuned and the amplitude of its oscillation decreased. Thus the absorption by this thin metal layer of the radial field perpendicular to the axis of the coil can be measured, as a change in output of the circuit, and this change can readily be detected by any conventional means and utilised to provide a visual indication of the detection or to effect or initiate a control action.

The thinness of the metal layer of the marking in relation to the metal employed is preferably such that the specific surface resistance of the layer is approximately equal to its specific surface reactance in the frequency range employed for detecting the marking.

Dielectric losses may be considered as contributing to resistance in this respect.

With appropriate choice of frequency of operation of the generator of the detector in relation to the thickness and nature of the metal layer, discrimination can be achieved between the marking and other metal objects, such as for example paper-clips, keys, coins, or silver-paper, or tinfoil, which may be enclosed in a postal packet, even though these other metal objects are in the same relative position to the coil as the thin metal marking to be detected.

Whilst described in connection with the simple detection of a single marking having purely positional significance, the invention is also applicable to the reading of coded markings having alphabetical, numerical, or other information significance.

Brief description of the drawings

The above mentioned and other features, objects, and advantages, and the manner of obtaining them are described more specifically below by reference to embodiments of this invention shown in the accompanying drawings, wherein.

Detailed description of preferred embodiments

The formula for the energy absorbed from the field of a coil is:

$$P=\frac{4H^2}{Ka}F$$

P=the energy absorbed from the field (field in the direction of the layer),
H=the field strength,
K=the susceptibility (Kappa),
$a$=the thickness of the layer,
F=the area of the layer.

Figure 1:
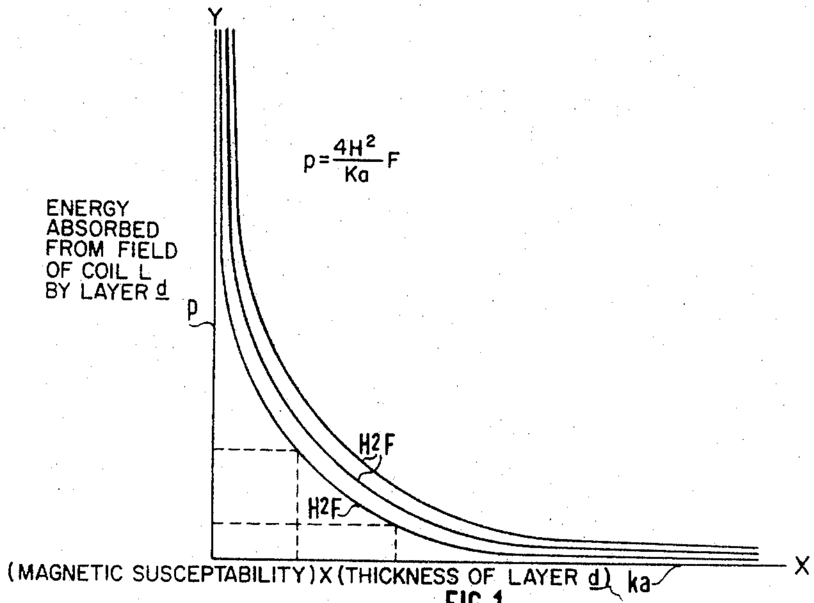
FIG. 1 shows some graphs concerning the absorption of energy from the field of a coil.

This formula is represented by an equilateral hyperbola. In FIG. 1 the variables K$a$ and P are shown, plotted along an $x$-axis and a $y$-axis, respectively, three hyperbolas being drawn for three values of the parameter $H^2F$.

It can be seen from these graphs that the absorbed energy increases rapidly with smaller values of K$a$; which provides a good possibility for recording the absorbed energy.

Figure 2:
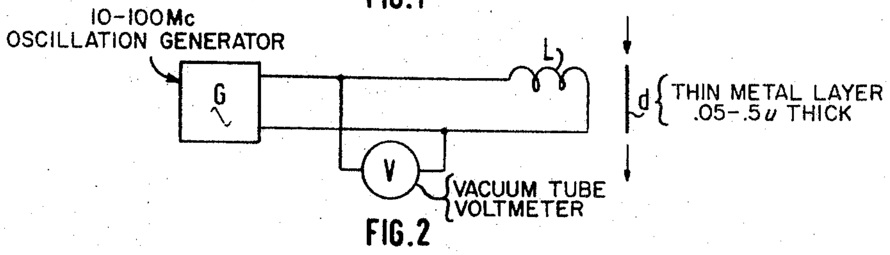
FIG. 2 shows a schematic circuit diagram of an embodiment of the device for detecting the markings.

A suitable apparatus utilizing the invention is shown diagrammatically in the accompanying FIGURE 2.

In this FIG. 2, the oscillation generator G operates in the range 10 to 100 mc./s. with a power output of 10 to 100 mw. A generator found suitable for this purpose was a grid dip oscillator made by Measurements Corp. Boonton, Model 59. Across the two conductors from the generator G to an inductance coil L is a vacuum tube voltmeter *v* having a range of 0–10 v., for which purpose a Hewlett Packard vacuum tube voltmeter has been found suitable. The coil L has from one to three turns of 1 mm. gauge wire wound with a winding diameter of 20 mm. and presents an inductance value of from 0.1 to 0.5 $\mu$h (microhenrys).

The metal layer *d* on the article, is from 50 to 500 millimicrons thickness, and is disposed for movement in the direction of the arrows in the plane of the coil L at a spacing from coil L of about 1 mm.

With such an arrangement it is found that the spacing of the layer *d* from the coil L is not critical, and maximum deflection of the needle of the vacuum tube voltmeter *v* is obtained with a spacing of about 1 mm. with the area of the layer equal to or greater than the cross sectional area of the coil, and the thickness of the layer *d* being less than the skin thickness for the frequency employed. In the absence of the layer *d*, the vacuum tube voltmeter *v* registers maximum deflection and when the layer *d* is in position shown in FIG. 2, the voltmeter *v* registers a minimum deflection. Gold, silver or copper can be used as the metal of the layer and yet thicker articles of the same metal, for example a silver coin, in the same position relative to the coil will not produce any significant deflection on the vacuum tube voltmeter *v*.

Figure 3:
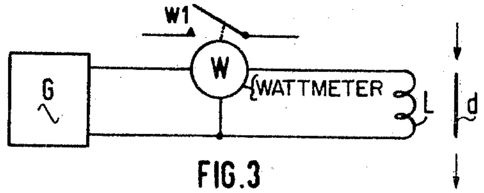
FIG. 3 shows a schematic circuit diagram of a second embodiment of such a detecting device.

In FIG. 3 is shown another circuit utilizing this invention. In this figure, a wattmeter W with a contact *w*1 is employed across the conductors connected to the high frequency generator G. In this embodiment the contact *w*1 is closed when the absorbed energy raises above a predetermined level, so that this contact *w*1 can be used for indicating when the article *d* passes the coil L.

Figure 4:
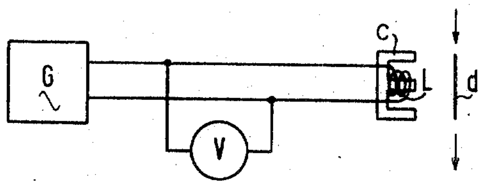
FIG. 4 shows a schematic circuit diagram of a third embodiment.

In FIG. 4 is shown a circuit similar to that employed in FIG. 2, except that the coil L is wound on an E-shaped iron core C for insuring the radial direction of the lines of force from the end of the coil.

While we have illustrated and described what we regard to be the preferred embodiments of our invention, nevertheless it will be understood that such are merely exemplary and that numerous modifications and rearrangements may be made therein, without departing from the essence of the invention.

We claim:

1. A method of marking articles and detecting said markings as they move along a given path comprising the steps of:

(a) applying to said article a thin layer of electrically conducting material, said layer's thickness being between about 50 and 500 millimicrons, (b) positioning at a point along said path an induction coil of an oscillating circuit and energizing said coil to produce a magnetic field in said path at a freqency such that the depth of penetration of said field into said material is greater than the thickness of said layer, said frequency being between about 10 and 100 megacycles, (c) detecting reductions in amplitude of the oscillations in said circuit caused by changes in the inductance or Q of the induction coil, said inductance or Q being greatly affected by said layer while being substantially unaffected by layers of greater thickness.

2. A method according to claim 1 wherein said coil has a cross-sectional area equal to or less than the area of said layer.

3. A method according to claim 1 wherein said layer comprises a metal selected from the group consisting of of aluminum, zinc, copper, silver, and gold.

4. A method according to claim 1 wherein said detecting involves a vacuum tube voltmeter.

5. A method according to claim 1 wherein said detecting involves a wattmeter and electrical contacts operated by said wattmeter.

6. A method according to claim 1 wherein said coil is wound around the center leg of an E-shaped iron core.

References Cited

UNITED STATES PATENTS

| | | | |
|---|---|---|---|
| 2,933,677 | 4/1960 | Lieber | 324—40 |
| 3,000,498 | 9/1961 | Copping | 209—81 |
| 3,077,858 | 2/1963 | Ulug | 324—34 |
| 3,205,485 | 9/1965 | Nolting | 324—40 |
| 2,774,060 | 12/1956 | Thompson | 324—41 |
| 3,136,424 | 6/1964 | Silverschotz | 209—111.8 |
| 3,309,711 | 3/1967 | Sorrells et al. | 209—111.5 |
| 3,315,805 | 4/1967 | Brenner et al. | 209—111.8 |

FOREIGN PATENTS

| | | |
|---|---|---|
| 536,687 | 2/1957 | Canada. |
| 858,583 | 1/1961 | Great Britain. |

RUDOLPH V. ROLINEC, Primary Examiner

R. J. CORCORAN, Assistant Examiner

U.S. Cl. X.R.

209—111.5, 111.8

PO-1050
(5/69)

UNITED STATES PATENT OFFICE
CERTIFICATE OF CORRECTION

Patent No. 3,473,111 Dated Oct. 14, 1969

Inventor(s) C. P. LEERSNIJDER et al

It is certified that error appears in the above-identified patent and that said Letters Patent are hereby corrected as shown below:

Column 1, line 56, after "layer," insert -- so -- ; line 62, "pockets" should read -- packets --

SIGNED AND
SEALED
JAN 20 1970

(SEAL)
Attest:

Edward M. Fletcher, Jr.
Attesting Officer

WILLIAM E. SCHUYLER, JR.
Commissioner of Patents